United States Patent
Fisher et al.

(10) Patent No.: US 7,326,392 B2
(45) Date of Patent: Feb. 5, 2008

(54) $H_2S$ SCAVENGING METHOD

(75) Inventors: Kevin S. Fisher, New Braunfels, TX (US); Kenneth E. McIntush, New Braunfels, TX (US)

(73) Assignee: Gas Technology Institute, Des Plaines, IL (US)

( * ) Notice: Subject to any disclaimer, the term of this patent is extended or adjusted under 35 U.S.C. 154(b) by 414 days.

(21) Appl. No.: 10/909,707

(22) Filed: Aug. 2, 2004

(65) Prior Publication Data

US 2006/0024225 A1    Feb. 2, 2006

(51) Int. Cl.
*B01D 53/52* (2006.01)
(52) U.S. Cl. ............... 423/242.1; 423/242.2; 423/243.01; 423/573.1; 423/576.4
(58) Field of Classification Search ............ 423/242.1, 423/242.2, 243.01, 573.1, 575, 576.7, 576.4; 239/4
See application file for complete search history.

(56) References Cited

U.S. PATENT DOCUMENTS 4,125,589 A * 11/1978 deVries .................. 423/245.2
4,416,861 A * 11/1983 deVries .................... 423/210
6,136,282 A    10/2000 Fisher

OTHER PUBLICATIONS

Arthur L. Kohl et al. "Gas Purification" 5th Ed., (1997) Gulf Publishing Co., Houston, Texas USA, ISBN 0-88415-220-0,☐☐pp. 738-741.*
Roger Grant et al. (editors) "Grant and Hackh's Chemical Dictionary" 5th Ed, (1987) McGraw-Hill Book Co., USA, ISBN 0-07-024067-1, p. 292.*
Fisher, Kevin, "Direct-Injection Testing of $H_2S$ Scavenging at GRI's Pipe Loop in South Texas", 48th Laurence Reid Gas Conditioning Conference, Mar. 1-4, 1998, pp. 285-320.
Beggs, H. Dale et al., "A Study of Tw0-Phase Flow in Inclined Pipes", J. of Petroleum Technology, V 25(5): 607-16, May 1973.

* cited by examiner

*Primary Examiner*—Timothy C. Vanoy
(74) *Attorney, Agent, or Firm*—Mark E. Fejer

(57) ABSTRACT

A method for removing $H_2S$ from $H_2S$-containing gaseous streams in which an $H_2S$-containing gaseous stream is introduced into a flow channel and at least one liquid chemical $H_2S$ scavenging agent is also introduced into the flow channel. Directly within the flow channel, liquid chemical $H_2S$ scavenging agent is transformed into a plurality of $H_2S$ scavenging agent droplets, which plurality of $H_2S$ scavenging agent droplets are contacted with the $H_2S$-containing gaseous stream, whereby at least a portion of the $H_2S$ is absorbed by the plurality of $H_2S$ scavenging agent droplets. In accordance with one embodiment, transformation of the liquid chemical $H_2S$ scavenging agent is carried out in an inclined flow channel and in accordance with another embodiment, the transformation is carried out using ultrasonic atomization.

18 Claims, 5 Drawing Sheets

$H_2S$ SCAVENGING METHOD

BACKGROUND OF THE INVENTION

1. Field of the Invention

This invention relates to a method for removal of hydrogen sulfide ($H_2S$) from $H_2S$-containing gaseous streams utilizing a dispersed $H_2S$ scavenging agent within the stream of $H_2S$-containing gas. More particularly, this invention is related to a method for removal of $H_2S$ from $H_2S$-containing gaseous streams which provides a substantial improvement in surface area exposure of the $H_2S$ scavenging agent to the $H_2S$-containing gaseous stream, thereby increasing the efficiency of $H_2S$ removal compared to conventional methods and, in turn, reducing the material requirements over conventional methods. This method is particularly suitable for $H_2S$-containing gaseous streams, such as natural gas, containing small amounts of $H_2S$, typically less than about 200 ppm of $H_2S$.

2. Description of Related Art

Substantial amounts of sour natural gas are currently being produced from natural gas wells, oil wells (as associated gas), and from natural gas storage reservoirs that have been infected with $H_2S$-producing bacteria. The presence of $H_2S$ in fuel and other gaseous streams has long been of concern for both the users and the producers of such gaseous streams. For example, in the case of natural gas, historically about 25% of the natural gas produced in the United States has been sour, that is, containing greater than about 4 ppmv $H_2S$ (5.7 mg $H_2S/m^3$). In addition to the corrosive and other adverse effects that such impurities have upon equipment and processes with which such gaseous streams interact, noxious emissions are commonly produced from combustion of the natural gas as a result of oxidation of the hydrogen sulfide. The resulting sulphur oxides are a major contributor to air pollution and may have detrimental impact upon humans, animals, and plant life. Increasingly stringent federal and state regulations have accordingly been promulgated in an effort to reduce or eliminate sulphurous emissions, and a concomitant interest exists in efficiently removing from natural gas streams and the like the hydrogen sulfide that comprises a significant precursor of the emissions.

A growing segment of the natural gas industry uses $H_2S$ scavenging processes to remove low concentrations of $H_2S$ (usually less than about 300 ppm) from sub-quality natural gas at remote locations. For this gas segment, conventional amine sweetening is not economically feasible, particularly when carbon dioxide ($CO_2$) removal is not required. Historically, the natural gas production industry has used non-regenerable scavenging processes to treat this gas. In these processes, a scavenging agent reacts irreversibly with $H_2S$. The reaction products are subsequently separated from the treated sweet gas and discarded.

Hydrogen sulfide scavenging agents are most commonly applied through one of the following three methods: (1) batch application of liquid scavenging agents in a sparged tower contactor; (2) batch application of solid scavenging agents in a fixed-bed contactor; or (3) continuous direct injection of liquid scavenging agents. Conventional direct-injection $H_2S$ scavenging uses an open pipeline as a contactor. In these applications, $H_2S$ scavenging agents, e.g. aqueous formulations of 1,3,5 tri-(2-hydroxyethyl)-hexahydro-S-triazine, are injected into the gas stream where $H_2S$ is absorbed into the solution and reacted to form byproducts which are subsequently removed from the natural gas stream and discarded. An alternative method for direct-injection $H_2S$ scavenging involves the forcing of a liquid jet of $H_2S$ scavenging agent through a small opening under high pressure, such as an atomizing nozzle, thereby causing the jet to break apart into small droplets. However, droplets produced by this mechanical method of atomization are generally larger than 15 microns in diameter.

For many applications, a direct-injection approach has the potential for the lowest overall costs because of its low capital cost relative to batch applications. Given the estimated $50 million per year in $H_2S$ scavenging chemical costs in the United States, significant cost savings are realizable from an $H_2S$ scavenging process utilizing continuous direct-injection of scavenging agents into the gaseous stream to be treated over conventional batch direct-injection scavenging applications.

However, studies also have been conducted which show that the performance of direct-injection scavenging systems is more difficult to predict than tower-based systems because the underlying fundamentals of direct injection are largely unknown. In addition, $H_2S$ removal results, chemical usage, and chemical costs are highly site-specific, especially with regard to gaseous fluid velocity, liquid-gas mixing conditions, and contact time.

Several problems with conventional approaches for $H_2S$ removal from $H_2S$-containing gaseous streams continue to plague the industry. These include insufficient removal of $H_2S$, excessive use of scavenging agents, and the requirement for excessive lengths of piping and the associated size/weight of piping contactors. Such problems are of considerable importance in offshore applications where space is very limited.

SUMMARY OF THE INVENTION

Accordingly, it is one object of this invention to provide a method for $H_2S$ removal from $H_2S$-containing gaseous streams which reduces the amount of $H_2S$ scavenging agent required compared to conventional methods.

It is another object of this invention to provide a method for $H_2S$ removal from $H_2S$-containing gaseous streams which reduces the length of contactor pipe required compared to conventional methods.

These and other objects of this invention are addressed by a method for removing $H_2S$ from $H_2S$-containing gaseous streams comprising the steps of introducing an $H_2S$-containing gaseous stream into a flow channel, introducing at least one liquid chemical $H_2S$ scavenging agent into the flow channel, transforming said at least one liquid chemical $H_2S$ scavenging agent directly within the flow channel into a plurality of $H_2S$ scavenging agent droplets, and contacting the plurality of $H_2S$ scavenging agent droplets with the $H_2S$-containing gaseous stream, whereby at least a portion of the $H_2S$ is absorbed by the plurality of $H_2S$ scavenging agent droplets. The method of this invention creates order-of-magnitude increases in interfacial area available for mass transfer over conventional methods, which, in turn allows less chemical and/or less length and weight of contactor piping to be used compared to conventional direct injection methods and systems for removal of $H_2S$ from $H_2S$-containing gaseous streams.

In accordance with one embodiment of the method of this invention, transformation of the liquid chemical $H_2S$ scavenging agent into droplets is accomplished by orientation of an unobstructed flow channel at an angle greater than 0° with respect to horizontal, introduction of the $H_2S$-containing gaseous stream into the vertically lower end of the flow channel, and introduction of the $H_2S$ scavenging agent into the flow channel proximate the vertically lower end of the flow channel and downstream of the point of introduction of the $H_2S$-containing gaseous stream into the flow channel. In this way, the $H_2S$-containing gaseous stream and the liquid $H_2S$ scavenging agent are caused to flow upward through the flow channel, or plurality of flow channels, which flow channels may take the form of conventional piping or parallel plates. Inclining the flow channels causes a substantial amount of the liquid chemical $H_2S$ scavenging agent to remain in the flow channels, which, in turn, causes the liquid to recirculate as the $H_2S$-containing gaseous stream forces some of the liquid upward while gravity causes some of the liquid to fall back. The liquid $H_2S$ scavenging agent is sheared by the gas, resulting in the formation of droplets, and the larger volume fraction of liquid results directly in increased interfacial area between the liquid and gas.

In accordance with another embodiment of the method of this invention, transformation of the liquid chemical $H_2S$ scavenging agent into droplets is accomplished by introducing the $H_2S$-containing gaseous stream into a flow channel containing at least one contactor element having at least one vibratile surface, vibrating the at least one vibratile surface at an ultrasonic frequency, resulting in at least one vibrating surface, and contacting the at least one vibrating surface with at least one liquid chemical $H_2S$ scavenging agent, forming a plurality of liquid chemical $H_2S$ scavenging agent droplets within the flow channel. The droplets thus formed contact the $H_2S$-containing gaseous stream, whereby at least a portion of the $H_2S$ in the $H_2S$-containing gaseous stream is absorbed by the liquid chemical $H_2S$ scavenging agent droplets and the concentration of the $H_2S$ in the $H_2S$-containing gaseous stream is reduced.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Definitions

As used herein, the term "flow channel" refers to any enclosed passage for transport of a fluid. Examples include pipes, tubes and spaced apart planar elements closed off on two opposed sides.

As used herein, the term "liquid stream" refers to a continuously flowing liquid or uninterrupted flowing liquid in contrast to liquid droplets or liquid droplet streams, which are considered to constitute a non-continuous or interrupted flow of liquid.

As used herein, the term "ultrasonic frequency" refers to a frequency that is above the audible range, typically considered to be about 20,000 Hz and above.

In accordance with one embodiment of the method of this invention, an $H_2S$-containing gaseous stream is introduced into the vertically lower end of an inclined flow channel, resulting in an upward flow of the stream, and a liquid stream of an $H_2S$ scavenging agent is introduced into the flow channel proximate the vertically lower end of the inclined flow channel downstream of the location at which the $H_2S$-containing gaseous stream is introduced into the flow channel. By virtue of this arrangement, the liquid $H_2S$ scavenging agent is sheared by the $H_2S$-containing gaseous stream, resulting in the formation of droplets of $H_2S$ scavenging agent. Contact between the droplets of $H_2S$ scavenging agent and the $H_2S$-containing gaseous stream results in the absorption of $H_2S$ from the $H_2S$-containing gaseous stream into the droplets of $H_2S$ scavenging agent. The treated $H_2S$-containing gaseous stream and spent $H_2S$ scavenging agent are then removed through a treated gas outlet of the flow channel.

Figure 1:
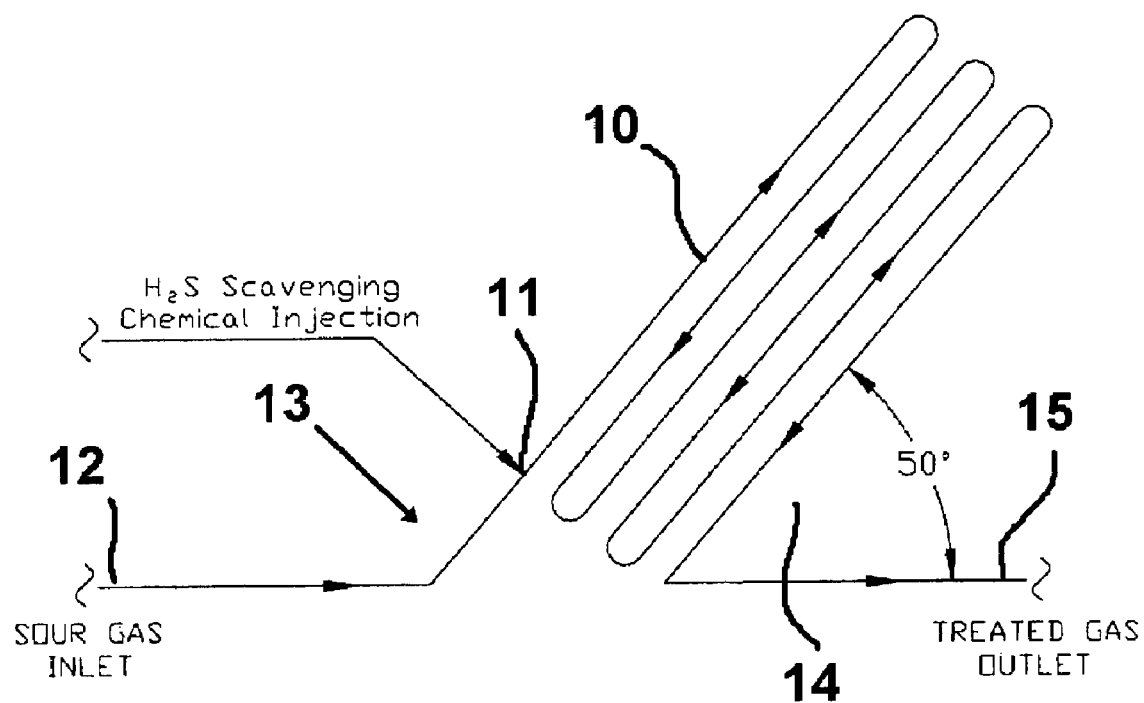
FIG. 1 is a schematic diagram of an inclined-flow contactor having a serpentine configuration for employment in the method of this invention.

The method in accordance with one embodiment of this invention may be embodied in a simple inclined-flow contactor having a serpentine configuration or form as shown in FIG. 1. In particular, the contactor comprises at least one inclined conduit 10 having a vertically lower end 13, an $H_2S$-containing gaseous stream inlet 12 disposed proximate said vertically lower end 13, and an $H_2S$ liquid chemical scavenging agent inlet 11 disposed downstream of said $H_2S$-containing gaseous stream inlet 12. Although any angle of inclination 14 may be employed, preferred angles of inclination of inclined conduit 10 are in the range of about 40° to about 60°, with the most preferred angle of inclination being about 50° off horizontal. For removal of the reduced $H_2S$ concentration gaseous stream, inclined conduit 10 includes a treated gas outlet 15 disposed at a conduit end opposite from the $H_2S$-containing gaseous stream inlet 12.

Figure 2:
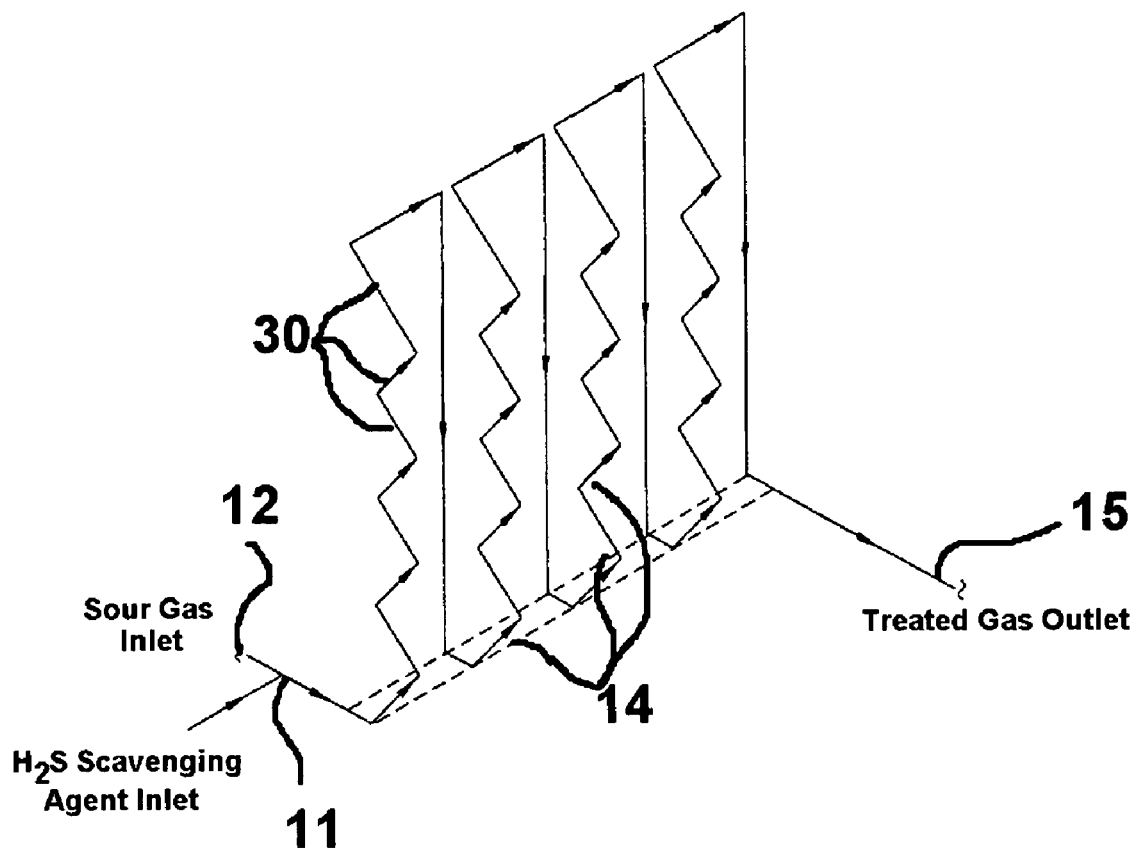
FIG. 2 is a schematic diagram showing an isometric view of an inclined-flow contactor having a serpentine configuration and a compact base footprint.
Figure 3:
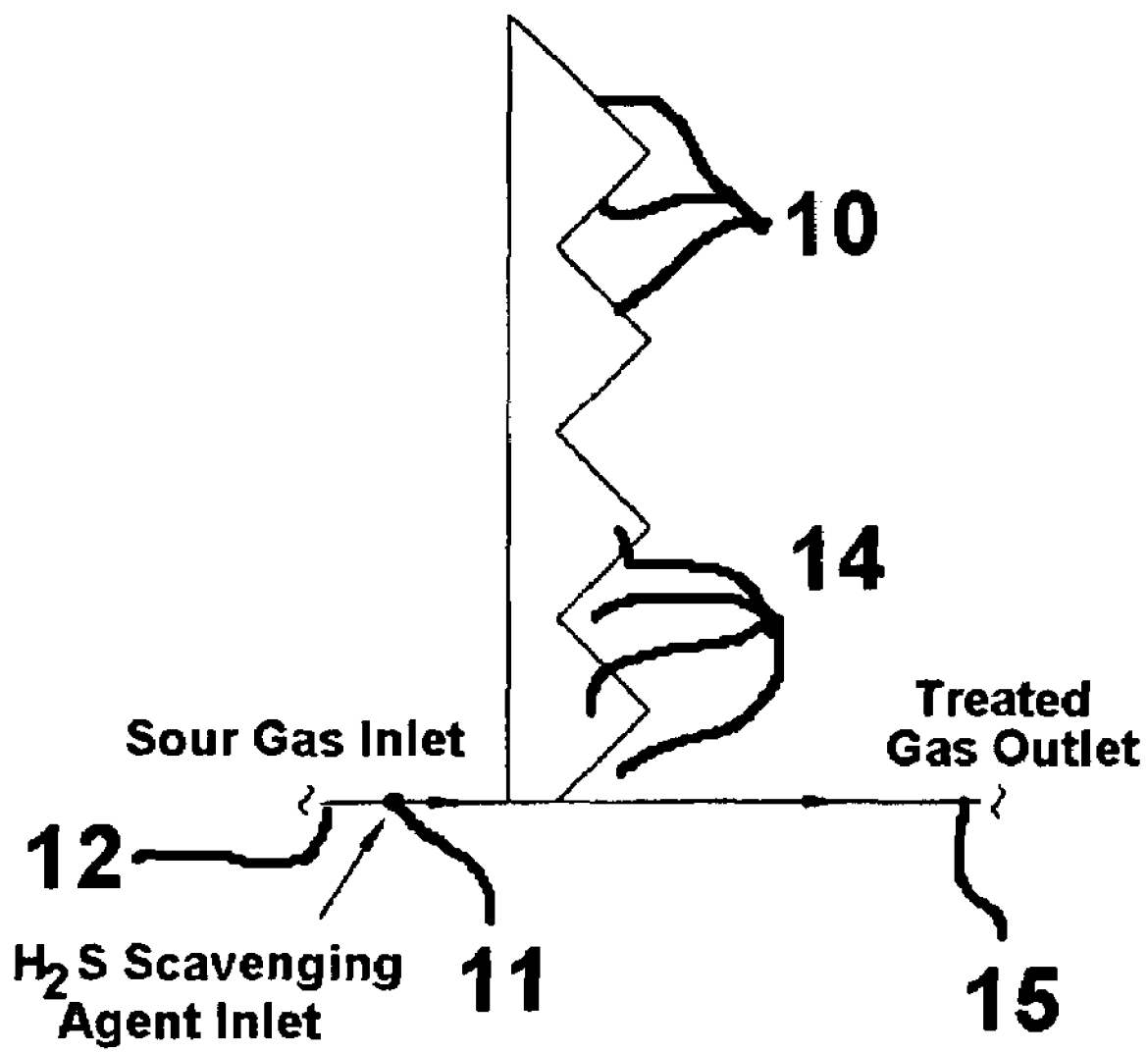
FIG. 3 is a schematic diagram showing an elevation view of the inclined-flow contactor having the serpentine configuration and compact base footprint shown in FIG. 2.

FIG. 2 shows an alternative serpentine conduit configuration suitable for use in the method of this invention, which configuration provides a relatively compact base footprint, an important consideration in limited space locations, such as offshore drilling platforms. As shown in FIG. 2, the inclined flow contactor comprises a vertically oriented conduit having a plurality of end-to-end conduit segments 30, with each segment being disposed at an angle 14 with respect to horizontal. An elevation view of this embodiment is shown in FIG. 3.

Figure 4:
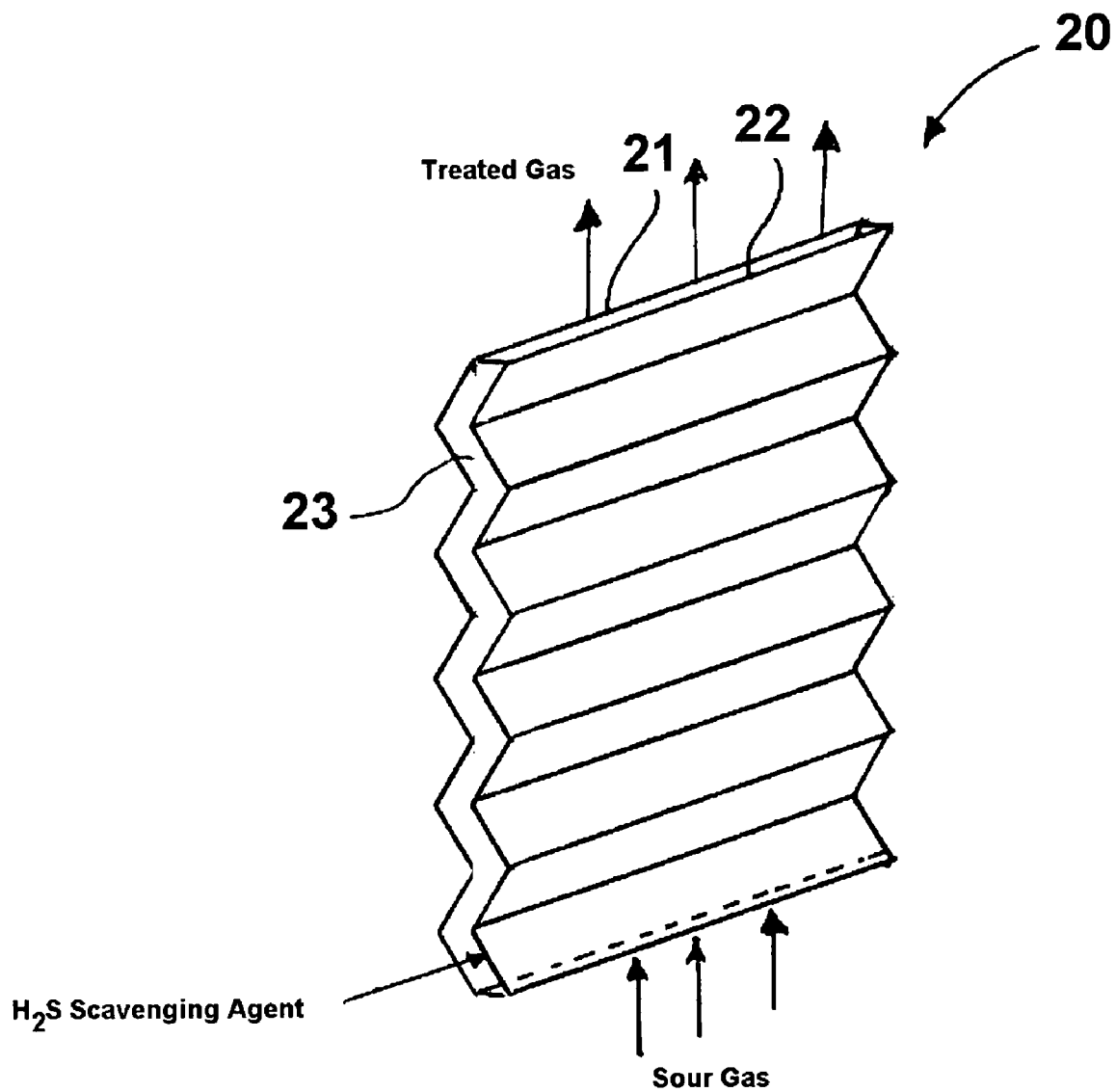
FIG. 4 is a schematic diagram of a flow channel formed between two parallel plates in accordance with one embodiment of this invention.

The method in accordance with another embodiment of this invention may be embodied as a conduit 20 comprising a plurality of vertically oriented, spaced apart parallel corrugated plates 21, 22 and forming a flow channel 23 therebetween as shown in FIG. 4. As can be seen, the upward inclines formed by the corrugations are at an angle with respect to horizontal thereby enabling "hold-up" of the liquid chemical $H_2S$ scavenging agent within flow channel 23 by the $H_2S$-containing gaseous stream entering at the lower end of flow channel 23 and transformation of the liquid chemical $H_2S$ scavenging agent into droplets within flow channel 23.

Figure 5:
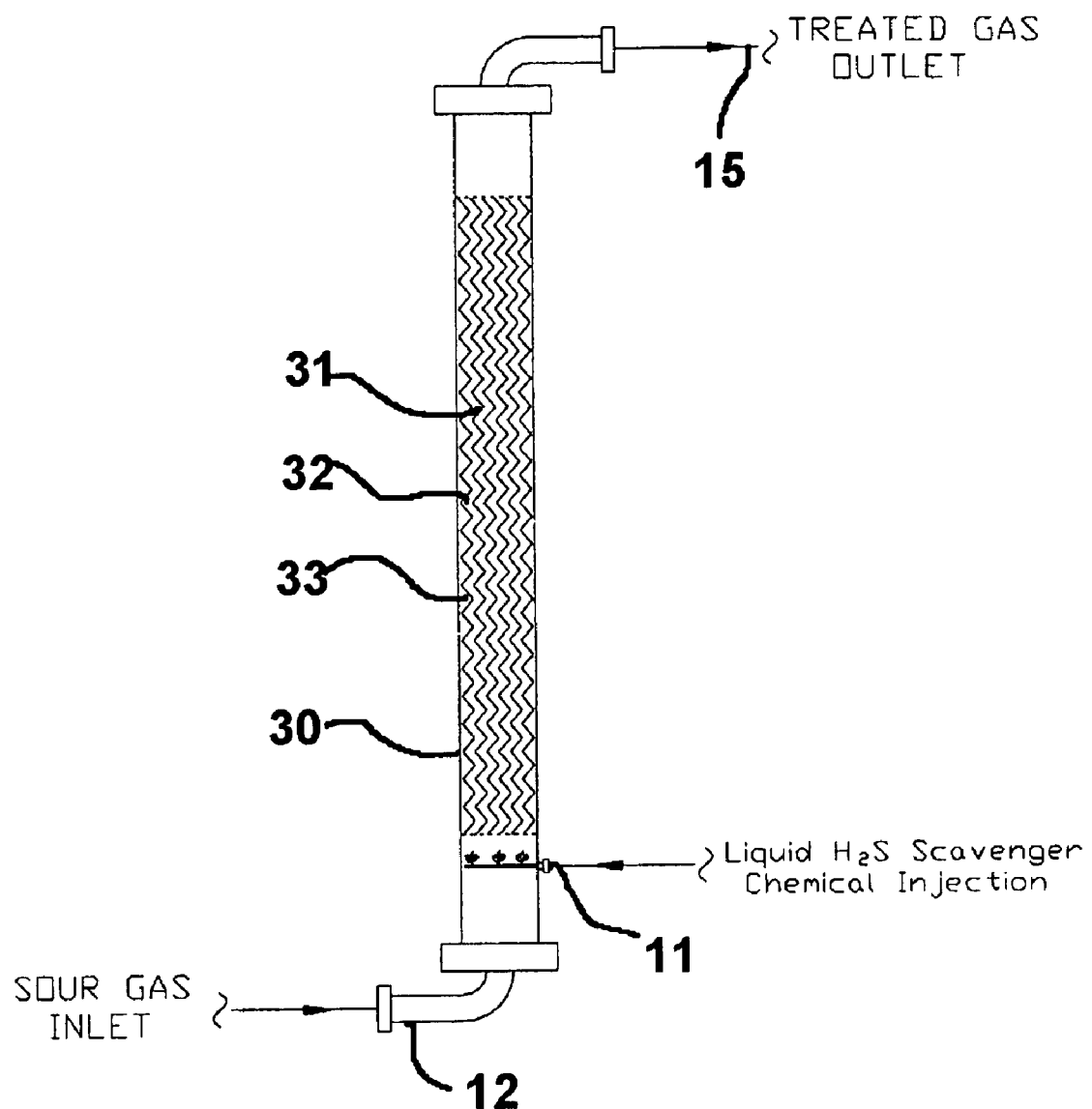
FIG. 5 is a schematic diagram of an inclined-flow contactor having an inclined plate pack for use in the method of this invention.

The method in accordance with yet a further embodiment of this invention may be embodied as shown in FIG. 5 in the form of a conduit insert comprising a plurality of spaced apart parallel corrugated plates 31, 33 disposed within a vertically oriented pipe 30 and forming a plurality of flow channels 32 whereby the $H_2S$-containing gaseous stream introduced through $H_2S$-containing gaseous stream inlet 12 and liquid chemical $H_2S$ scavenging agent introduced through $H_2S$ liquid chemical scavenging agent inlet 11 are caused to flow upward through flow channels 32 in an inclined manner.

It may appear to those skilled in the art that the embodiment of the method of the invention shown in FIG. 5 is nothing more than a static mixer device. However, static mixers are quite different in that they are designed to operate at high liquid/gas ratios and with downwardly directed flows. In addition, static mixer devices are designed to divide and recombine the flow many times to effect a thorough mixing of the fluids. In contrast thereto, the method in accordance with the embodiment shown in FIG. 5 operates with vertical upflow, at extremely low liquid/gas ratios (well below the range where static mixers would be employed), and with no functional or intended requirement to divide and recombine flow streams.

It also may appear to those skilled in the art that the embodiment of the method of the invention shown in FIG. 5 is nothing more than a vane-style mist-eliminator device. Although mist-eliminators may be similar in geometry to the conduit shown in FIG. 5, they are, in fact, quite different. In particular, mist-eliminators are designed to cause the liquid to flow in a downward direction counterflow to the direction of upwardly flowing gas. In addition, gas velocities in accordance with the method of this invention are substantially higher than in mist-eliminators, thereby causing both the $H_2S$-containing gaseous stream and the liquid chemical $H_2S$ scavenging agent to flow in an upward direction. Such a concurrent flow arrangement is generally to be avoided in mist-eliminators. In addition, the tortuous flow path encountered in mist-eliminators is designed to cause liquid droplets to impinge on the plate surface and become removed from the gas stream. In contrast thereto, the tortuous flow path employed in the method of this invention is used to provide an inclined flow configuration designed to maximize the liquid-gas slip and, thus, the volume of liquid and consequent interfacial surface area within the flow channels.

As previously indicated, one of the many benefits derived from the method of this invention is the substantially reduced flow channel length compared to conventional methods and systems. Table 1 shows an estimated difference in flow channel length between the conventional art and the present invention based upon a given set of inlet gas conditions.

TABLE 1

Estimated Performance of Inclined Flow Contactor vs. Conventional Art

| Inlet Gas Conditions | 20 Mmscfd gas flow rate<br>6 inches pipe diameter<br>1000 psig pressure<br>5 gallons/hr liquid scavenging agent injection rate<br>50 ppmv $H_2S$ |
|---|---|
| Outlet $H_2S$ Concentration | 4 ppmv or less |
| Conventional Art - Length of horizontal pipe required to obtain 4 ppmv in treated gas | 500 feet |
| Inclined Flow Contactor - Length of pipe required to obtain 4 ppmv in treated gas | 40 feet |

In the example of a typical gas treating application embodied in Table 1, a liquid chemical $H_2S$ scavenging agent is directly injected into the $H_2S$-containing gaseous stream whereby the scavenging agent absorbs $H_2S$ from the gaseous stream as the gas and liquid flow down the pipe. As shown in Table 1, the conventional art (horizontal contactor pipe) would require about 500 feet of pipe to provide enough contact between the liquid chemical $H_2S$ scavenging agent and the $H_2S$-containing gaseous stream to reduce the $H_2S$ content from an inlet concentration of about 50 parts per million by volume (ppmv) down to below the typical gas treatment specification of 4 ppmv. In contrast thereto, utilizing the method of this invention, the estimated pipe length is only about 40 feet arranged in a serpentine inclined fashion as shown in FIGS. 1 and 2. This improvement over the conventional art results in an estimated 86% reduction in both pipe length and weight. This estimated performance may be determined as follows.

Calculation of Base Case Conditions (Conventional Art) Example conditions:

| Gas Flow rate | 20 Mmscfd |
|---|---|
| Pipe inside diameter | 6 inches |
| Pressure | 1000 psig |
| Scavenger flow rate | 5 gallons/hr |
| $H_2S$ concentration in sour gas | 50 ppmv |
| Pipe length | 500 ft |

Under these conditions, we apply the method of Fisher, "Direct-Injection Testing of $H_2S$ Scavenging at GRI's Pipe Loop in South Texas", 48th Laurence Reid Gas Conditioning Conference, Mar. 1-4, 1998, Norman, Okla., to calculate the overall mass transfer coefficient, $K_g a$ as follows:

$$K_g a = 0.82 \text{ lbmol/hr/ft}^3/\text{atm} \qquad [1]$$

In order to achieve 4 ppmv of $H_2S$ in the treated gas, we need 2.53 transfer units (NTUs) and 500 ft of pipe:

$$NTU = \frac{K_g a P Z}{G} = 2.53 \qquad [2]$$

$$P = 69 \text{ atm} \qquad [3]$$
$$Z = 500 \text{ feet}$$
$$G = 11200 \text{ lbmol/hr/ft}^2$$
$$NTU = \ln\left(\frac{y_{in}}{y_{out}}\right) = \ln\left(\frac{50}{4}\right) = 2.53$$

The approach for estimating the improvement in performance resulting from implementation of the method of this invention employing inclined flow channels is to estimate the increase in $K_g a$ that is expected based upon the increase in liquid fraction in the pipe and the consequent increase in surface area. The steps of this calculation are as follows:

Step 1: Calculate the Area "A" for the Conventional Method

The interfacial area for the conventional method can be estimated from the area of the pipe walls, and the area from the entrained droplets assuming zero slip velocity. Thus, the interfacial area can be calculated as follows:

$$a = \frac{4}{d} + \frac{6 G_l}{\rho_l U_g D_d} \qquad [4]$$

where

-continued $a$ = Interfacial area of pipe, ft$^2$/ft$^3$ $d$ = Pipe inside diameter, 0.5 ft $G_l$ = Liquid mass velocity, 0.0591 $lb_m$/ft$^2$/s $\rho_l$ = Liquid density, 52 $lb_m$/ft$^3$ $U_g$ = Gas superficial velocity, 16 ft/sec $D_d$ = Droplet diameter, assume 50 microns, or 0.000164 ft This equation is widely known to those skilled in the art. The first term is simply the interfacial area of the pipe walls expressed as surface area of pipe wall per unit volume of pipe. The second term is the interfacial area of the droplets. This term is also well known (See for example, Perry's Chemical Engineer's Handbook, 6th ed., equation 18-90, page 18-42.). Thus, from the values above, we calculate an interfacial area of 8 ft$^2$/ft$^3$ from the pipe walls and 2.17 ft$^2$/ft$^3$ from the droplets for a total of 10.17 ft$^2$/ft$^3$.

Step 2: Calculate the Improved Area "a" for the Method of this Invention

The following table shows calculations that were made using the Beggs/Brill method to estimate the liquid volume fraction that results under the flow conditions of this example, but with an upward incline of 50° from horizontal.

The calculated liquid fraction in the inclined pipes is 0.0325 under these flow conditions. The surface area of these entrained droplets can be estimated from the droplet size (a reasonably conservative droplet size of 500 microns is used):

$$\text{Surface Area from Droplets} = 0.0325 \left( \frac{6}{D_d} \right) = 119 \text{ ft}^2/\text{ft}^3 \quad [5]$$

Thus, with the 8 ft$^2$/ft$^3$ contributed by the pipe walls, the entire surface is estimated to be 127 ft$^2$/ft$^3$.

Step 3: Calculate the Length of Pipe Required Using the Method of this Invention Based Upon the Improved Area Term "a"

Referring back to equation [3] above, we see that holding all terms constant except for the pipe length and the interfacial area results in the pipe length being inversely proportional to the total surface area.

Thus, the length of pipe required for the inclined flow channel method of this invention is:

$$\text{Pipe length} = 500 \left( \frac{10.17}{127} \right) = 40 \text{ ft} \quad [6]$$

Estimation of Liquid Volume Fraction for Example Case with 50-Degree Inclination Angle
Material taken from Beggs, H. Dale, and Brill, James P., "A Study of Two-Phase Flow in Inclined Pipes"
Journal of Petroleum Technology, 25, p 607-617, 1973.

Input Data

| | | |
|---|---|---|
| Liquid Density, lb/ft$^3$ | 62 | |
| Vapor Density, lb/ft$^3$ | 3.5 | |
| Pipe Diameter, ft | 0.5 | |
| Superficial Gas Velocity, ft/sec | 16 | |
| Liquid Flow Rate, gal/hr | 5 | |
| Surface Tension, dyne/cm | 50 | |
| Inclination Angle, degrees | 50 | |
| Calculate gamma factor | 0.00018568 | Liquid volumetric rate, ft$^3$/sec |
| | 0.196349375 | Pipe cross-sectional area, ft$^2$ |
| | 3.14159 | Gas volumetric rate, ft$^3$/sec |
| | 5.91004E−05 | Gamma Factor |
| Calculate X factor | −9.736272147 | |
| Calculate L1 factor | 236.9487968 | |
| Calculate L2 factor | 19.9534253 | |
| Calculate Froude Number | 16.00094566 | Mixture superficial velocity, ft/sec |
| | 15.90250075 | Froude Number |
| Calculate Liquid Velocity Number | 0.003426105 | Surface tension, lbf/ft |
| | 0.000945663 | Liquid superficial velocity, ft/sec |
| | 0.001932886 | Liquid Velocity Number |
| Calculate Values of "C" for Upflow | | |
| Segregated Flow | 5.596694889 | |
| Intermittent Flow | 1.181179753 | |
| Distributed Flow | 0 | |
| Calculate Holdup for Horizontal Pipe, H(0) | | |
| Segregated Flow | 0.006884173 | |
| Intermittent Flow | 0.004399968 | |
| Distributed Flow | 0.003101379 | |
| Determine Actual Horizontal Pipe Holdup and C Value | | |
| Horizontal Holdup, H(0) | 0.006884173 | |
| C Value | 5.596694889 | |
| Calculated Liquid Fraction | 0.032569915 | |

These calculations show that only 40 feet of pipe arranged in the inclined upflow configuration are all that is needed to have the same performance as 500 feet of pipe.

In accordance with one embodiment of the method of this invention, the formation of droplets of $H_2S$ scavenging agent is achieved by exposure of the liquid chemical $H_2S$ scavenging agent to ultrasonic frequencies. In particular, this method employs a vibrating surface to cause a liquid-film of the liquid chemical $H_2S$ scavenging agent disposed thereon to become unstable and disintegrate into small droplets. This method differs substantially from the conventional art in which a liquid jet of $H_2S$ scavenging agent is forced through a small opening, such as a nozzle, under high pressure to cause the jet to break apart into small droplets. In addition to the different means for generating the droplets employed by the conventional art and the method of this invention, a significant benefit of the method of this invention is that droplets of 1 micron or less in diameter are easily formed compared to the conventional atomization methods, which generally produce droplets larger than 15 microns in diameter. The benefit derived from generating smaller droplets is a substantial increase in the surface area of the $H_2S$ scavenging agent available for contact by the $H_2S$-containing gaseous stream for a given amount of scavenging agent compared to conventional atomization methods. This, in turn, enables the use of a substantially reduced amount of $H_2S$ scavenging agent for the removal of a given amount of $H_2S$ compared to $H_2S$ removal methods employing conventional atomization methods.

The basic method of this invention involves feeding the $H_2S$ scavenging agent liquid through or over a transducer device, which device vibrates at ultrasonic frequencies to produce a fine atomization. The atomizer typically requires one or more piezoelectric transducer elements designed to convert electrical energy into high frequency, high energy, short wavelength vibrations. Table 2 shows an estimated difference in flow channel length between the conventional art and the ultrasonic atomization contactor embodiment of the method of the present invention based upon a given set of inlet gas conditions.

TABLE 2

Estimated Performance of Ultrasonic Atomization Contactor vs. Conventional Art

| | |
|---|---|
| Inlet Gas Conditions | 20 Mmscfd gas flow rate |
| | 6 inches pipe diameter |
| | 1000 psig pressure |
| | 5 gallons/hr liquid scavenging agent injection rate |
| | 50 ppmv $H_2S$ |
| Outlet $H_2S$ Concentration | 4 ppmv or less |
| Conventional Art - Length of horizontal pipe required to obtain 4 ppmv in treated gas | 500 feet |
| Ultrasonic Atomization Flow Contactor - Length of pipe required to obtain 4 ppmv in treated gas | 44 feet |

Calculation of the improvement in performance using the ultrasonic atomization embodiment of the method of this invention is as follows:

Referring back to equation [4] above, we found that the surface area from 50 micron droplets was about 2.17 $ft^2/ft^3$. Equation [5] shows that this area is inversely proportional to the droplet diameter. Therefore, with a droplet diameter of about 1 micron, as can be obtained with ultrasonic atomization in accordance with the method of this invention, we produce 50× the surface area from droplets, or 108.5 $ft^2/ft^3$. Combining this surface area with the area from the pipe walls results in a total area of about 116.5 $ft^2/ft^3$. The pipe length is then calculated as before in equation [6]:

$$\text{Pipe length} = 500\left(\frac{10.17}{116.5}\right) = 44 \text{ ft} \quad [7]$$

In addition to the reductions in pipe length required for a given contact, the method of this invention also has the advantage of reducing the chemical scavenging agent requirements when short pipe lengths are all that is available. For example, operators of offshore production platforms use excess amounts of liquid scavenging agent chemicals simply because their available pipe length for contact is short, having been constrained by the severe requirements of offshore production facilities. In these cases, application of the method of this invention can significantly reduce chemical costs, for example by as much as a factor of 2 or 3 (a 50 or 66% reduction in chemical usage and associated costs).

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for removing $H_2S$ from $H_2S$-containing gaseous streams comprising the steps of:
   introducing an $H_2S$-containing gaseous stream into an inclined flow channel;
   introducing at least one liquid chemical $H_2S$ scavenging agent into said inclined flow channel;
   transforming said at least one liquid chemical $H_2S$ scavenging agent directly within said inclined flow channel into a plurality of $H_2S$ scavenging agent droplets; and
   contacting said plurality of $H_2S$ scavenging agent droplets with said $H_2S$-containing gaseous stream within said inclined flow channel, whereby at least a portion of said $H_2S$ is absorbed by said plurality of $H_2S$ scavenging agent droplets within said inclined flow channel.

2. A method in accordance with claim 1, wherein said plurality of $H_2S$ scavenging agent droplets have a diameter of about 1 micron or less.

3. A method in accordance with claim 1, wherein said inclined flow channel is disposed at an angle greater than 0° with respect to horizontal, said $H_2S$-containing gaseous stream is introduced into said inclined flow channel through a flow channel opening disposed proximate a vertically lower end of said inclined flow channel, and said liquid chemical $H_2S$ scavenging agent is introduced into said inclined flow channel downstream of said flow channel opening.

4. A method in accordance with claim 3, wherein said angle is in a range of about 0.1° to about 90°.

5. A method in accordance with claim 3, wherein said angle is in a range of about 40° to about 60°.

6. A method in accordance with claim 3, wherein said angle is about 50°.

7. A method in accordance with claim 3, wherein said inclined flow channel has a serpentine form.

8. A method on accordance with claim 3, wherein said inclined flow channel is formed by at least two substantially vertically oriented substantially uniformly corrugated, spaced apart planar elements.

9. A method in accordance with claim 8, wherein a pitch of each corrugation of said at least two substantially vertically oriented substantially uniformly corrugated, spaced apart planar elements is in a range of about 40° to about 60° with respect to horizontal.

10. A method in accordance with claim 3, wherein said inclined flow channel comprises a plurality of substantially vertically oriented substantially uniformly corrugated spaced apart planar elements disposed within a substantially vertically oriented tubular member.

11. A method for removing $H_2S$ from $H_2S$-containing gaseous streams comprising the steps of:
  introducing said $H_2S$-containing gaseous stream into an inclined flow channel containing at least one contactor element;
  generating a plurality of liquid chemical $H_2S$ scavenging agent droplets within said inclined flow channel; and
  contacting said plurality of liquid chemical $H_2S$ scavenging agent droplets with said $H_2S$-containing gaseous stream within said inclined flow channel, whereby at least a portion of said $H_2S$ in said $H_2S$-containing gaseous stream is absorbed by said liquid chemical $H_2S$ scavenging agent droplets and a concentration of said $H_2S$ in said $H_2S$-containing gaseous stream is reduced.

12. A method in accordance with claim 3, wherein said liquid chemical $H_2S$ scavenging agent droplets are about 1 micron diameter or less in size.

13. A method for removing $H_2S$ from $H_2S$-containing gaseous streams comprising the steps of:
  introducing an $H_2S$-containing gaseous stream into a lower end gas input opening of an inclined flow channel disposed at an angle in a range of about 40% to about 60% with respect to horizontal; and
  introducing at least one liquid chemical $H_2S$ scavenging agent into said $H_2S$-containing gaseous stream in said inclined flow channel downstream of said lower end gas input opening, whereby at least a portion of said $H_2S$ is absorbed by said at least one liquid chemical scavenging agent within said inclined flow channel, forming a reduced $H_2S$ concentration $H_2S$-containing gaseous stream.

14. A method in accordance with claim 13, wherein said angle is about 50°.

15. A method in accordance with claim 13, wherein said inclined flow channel has a serpentine form.

16. A method on accordance with claim 13, wherein said flow channel is formed by at least two substantially vertically oriented substantially uniformly corrugated, spaced apart planar elements.

17. A method in accordance with claim 16, wherein a pitch of each corrugation of said at least two substantially vertically oriented substantially uniformly corrugated, spaced apart planar elements is in a range of about 40° to about 60° with respect to horizontal.

18. A method in accordance with claim 13, wherein said inclined flow channel comprises a plurality of substantially vertically oriented substantially uniformly corrugated spaced apart planar elements disposed within a substantially vertically oriented tubular member.

* * * * *